United States Patent [19]
Fuchi et al.

[11] Patent Number: 4,660,953
[45] Date of Patent: Apr. 28, 1987

[54] COUPLING DEVICE FOR PHOTOGRAPHING APPARATUS

[75] Inventors: Ikuo Fuchi, Kanagawa; Takashi Arai, Tokyo; Yoshio Amaya, Kanagawa, all of Japan

[73] Assignee: Canon Kabushiki Kaisha, Tokyo, Japan

[21] Appl. No.: 749,402

[22] Filed: Jun. 27, 1985

[30] Foreign Application Priority Data

Jul. 2, 1984 [JP] Japan ................................. 59-136716

[51] Int. Cl.$^4$ .............................................. G03B 17/12
[52] U.S. Cl. ..................................... 354/286; 350/257
[58] Field of Search ......................... 354/286; 350/257

[56] References Cited

U.S. PATENT DOCUMENTS 2,953,970  9/1960  Maynard ..................... 350/257 X
4,247,190  1/1981  Hashimoto et al. ................. 354/286
4,390,263  6/1983  Sumita ............................ 354/286

Primary Examiner—Michael L. Gellner
Attorney, Agent, or Firm—Toren, McGeady and Goldberg

[57] ABSTRACT

A coupling device for a photographic apparatus, comprises a mount member having a base part secured to the photographic apparatus, a cylindrical part which extends from the base part and a projecting part. A bayonet mount member is also included in the coupling device which member includes a ceramic engaging member which is made of ceramic material and is placed on the projecting part and a claw part which is formed jointly by the projecting part and the ceramic engaging member. The claw part is arranged to engage the bayonet member of an accessory to be mounted on the photographing apparatus. Other embodiments of the coupling device which incorporate a mount member of ceramic material are described.

5 Claims, 23 Drawing Figures

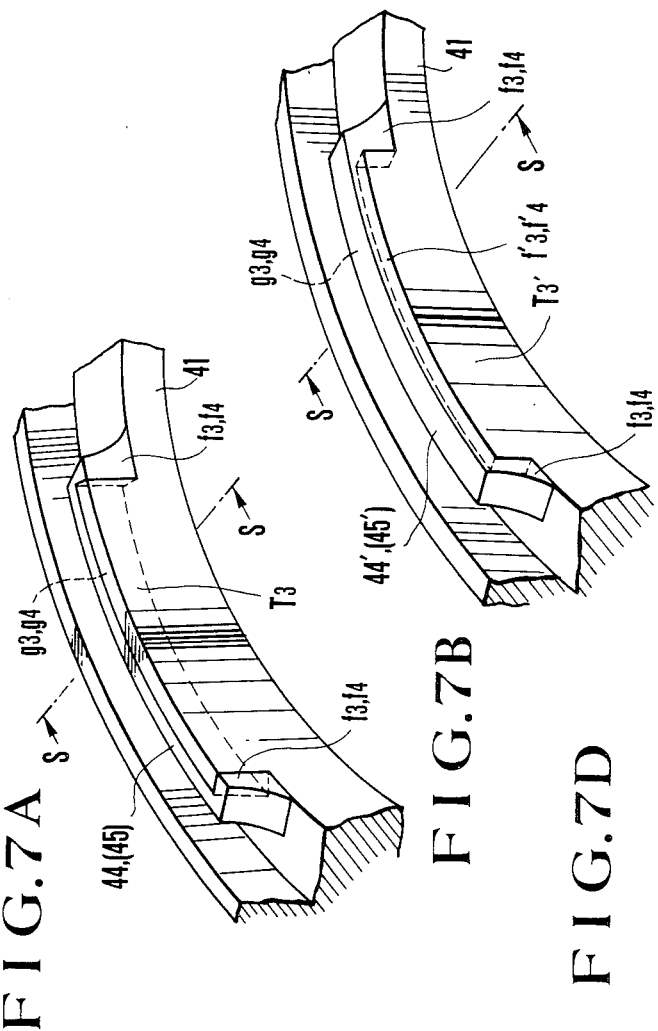

FIG.13

| PHYSICAL PROPERTIES \ MATERIAL | Al2O3 | ZrO2 | SiC | Si3N4 | Al-Zr | BRASS | ALUMINUM ALLOY Al6063-T6 | FIBROUS GLASS REINFORCED POLYCARBONATE |
|---|---|---|---|---|---|---|---|---|
| BULK DENSITY g/cm³ | 3.9 | 6.05 | 3.1 | 3.0 | 4.3 | 8.6 | 2.7 | 1.4 |
| BENDING STRENGTH kgf/mm² | 30 | 110 | 50 | 60 | 50 | — | — | 19 |
| FLEXURAL STRENGTH kgf/mm² | 40~70 | 20~30 | 50 | ~130 | 100 | — | — | — |
| COMPRESSIVE STRENGTH kgf/mm² | 350 | 90 | — | — | — | — | — | 16 |
| FRACTURE TOUGHNESS MN/m^(3/2) | 4 | 9 | 4 | 4 | 12 | 7.8 | — | — |
| HARDNESS HRA / Hv | 92 / 1800 | 90 / 1300 | 94 / 2000 | 92 / 1800 | 91 / 1600 | — | — | — |
| YOUNG'S MODULUS ×10⁶ kg/cm² | 3.7 | 1.6 | 4.2 | 3.2 | — | 1.0 | 0.7 | 0.07 |
| COEFFICIENT OF THERMAL EXPANSION 10⁻⁶/°C | 7.7 | 8.0 | 4.0 | 3.2 | 7.5 | 18 | 24~26 | 28 |
| ABRASION RESISTANCE | 1/300~700 | 1/300~500 | — | 1/300~700 | — | 1 | 1 | — |

| PHYSICAL PROPERTIES \ MATERIAL | FIBROUS GLASS REINFORCED CERAMIC | CASTING | CARBON STEEL |
|---|---|---|---|
| FRACTURE TOUGHNESS MN/m^(3/2) | 15~20 | 25 | 80 |

COUPLING DEVICE FOR PHOTOGRAPHING APPARATUS

BACKGROUND OF THE INVENTION

1. Field of the Invention

This invention relates to a coupling device for coupling a photographing apparatus such as a single-lens reflex camera, a video camera, a broadcasting camera or the like with an accessory such as an interchangeable lens which is to be attached to and detached from the apparatus and more particularly to such a coupling device made of a ceramic material.

2. Description of the Prior Art

In a camera of the kind using an interchangeable lens, mounts which are disposed both on the side of a camera body and on the side of the lens are respectively provided with datum parts for ensuring correct positions of both of these mounts relative to an optical system so that the focal plane of the optical system can be set to coincide with a film surface. In mounting the lens on the camera, when these datum parts are set in their coinciding positions, the focal plane of the optical system of the interchangeable lens coincides with the film surface within the camera, so that a good, sharply focused photograph can be taken.

Even if lenses are frequently interchanged one with another, the relative positions of the mounts must be always correctly maintained and yet mounting and dismounting of these lenses must be always smoothly carried out.

To meet the above-stated requirement for durable precision, the mounts have been made of one of the materials prepared in the following manners:

(1) Brass-machining-nickel-chrome plating
(2) Stainless steel-machining
(3) Stainless steel-press-finishing and welding
(4) A stainless steel alloy sintered body-machining
(5) Aluminum alloy-machining-alumite treatment The mounts have been thus made of a metal material such as brass, a stainless alloy steel, an aluminum alloy material, etc.

However, in cases where these mounts have been repeatedly subjected to strong abutting and sliding forces and external shocks which are exerted on them either singly or in combination during the mounting and dismounting operations repeated over a long period of time, the mounts on both sides wear or have scars or deformation. Then, the precision of their relative positions at the time of lens mounting decreases. In that event, it is hardly possible to obtain a sharp focus and the lens cannot be smoothly mounted and dismounted on and from the camera body. In the case of a mount made of a material which is prepared, for example, by plating brass with nickel-chrome or by applying an alumite treatment to an aluminum alloy, the nickel-chrome or alumite coating tends to peel off to accelerate thereby the degradation of precision and smoothness. Besides, the appearance impaired by the peeled off coating also degrades the value of the camera as a commercial article.

The conventional mount mechanisms for interchangeable lenses include a type called a spigot bayonet mount in which a bayonet mount member is arranged on the outside of one end of a lens barrel body to be rotatable relative to others as disclosed in U.S. Pat. No. 3,906,534; and another type called a total rotating mount which is arranged as disclosed in U.S. Pat. No. 4,247,190 and U.S. Pat. No. 4,230,403. In the case of these U.S. patents, the mount mechanism is made of a metal material.

In the case of metal mount members, the internal strain of the metal material or an internal strain which is caused by machining work or is developed under an assembled state brings about a secular change in dimensions after the lapse of a long period even without repeating mounting and dismounting operations. The metal mount member thus has presented another problem in terms of degradation in precision. Furthermore, to aid mounting and dismounting smoothness, sometimes has been applied a lubricant or the surface of the member has been hardened by nitriding, hard chrome plating or by applying a hard alumite treatment. However, this either impairs dimensional precision or increases the cost due to an additional manufacturing process. An improvement has been desired also in terms of performance.

It is an object of the present invention to provide a coupling device which is capable of preventing degradation of precision due to flaws such as scars and wear and external flaws such as scars and rust, which have been the drawbacks of the conventional coupling devices made of the above-stated materials.

It is another object of this invention to provide a coupling device which is divided into a plurality of bodies and in which the above-stated problems are solved by using a ceramic material for a part arranged to come into sliding contact with a mount member of a body to be coupled therewith.

SUMMARY OF THE INVENTION

A coupling device for a photographing apparatus including a mount member arranged to be coupled with another mount member which is disposed on the side of an accessory to be mounted on the photographing apparatus, the mount member being made of a ceramic material and including a base part secured to the photographing apparatus; a cylindrical part extending from the base part; and a bayonet engaging claw part which extends outward from the fore end of the cylindrical part radially relative to an optical axis and is arranged to engage another mount member of the accessory.

These and further objects and features of this invention will become apparent from the following detailed description of preferred embodiments thereof taken in conjunction with the accompanying drawings.

BRIEF DESCRIPTION OF THE DRAWINGS

FIGS. 6A, 6B, 6C, 6D, 7A, 7B, 7C and 7D show the details of the arrangement of the embodiment of this invention shown in FIGS. 5A and 5B.

FIG. 13 shows the properties of ceramic materials to be used according to this invention.

DETAILED DESCRIPTION OF THE PREFERRED EMBODIMENTS

Figure 1:
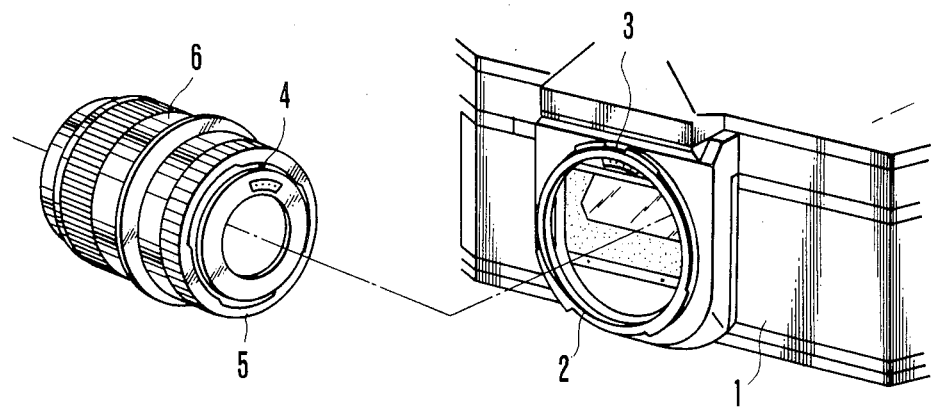
FIG. 1 is an oblique view showing a camera body and an interchangeable lens barrel which are arranged according to this invention.

FIG. 1 schematically shows a condition before coupling of a camera body and an interchangeable lens to which mount members, arranged according to this invention, are used to attain a salient advantageous effect. The illustration includes a camera body 1 and a bayonet mount member 2. The mount member 2 is attached to the camera body 1 in one unified body by suitable means such as screws, which is not shown in the drawing.

The mount member 2 is provided with a positioning notched key way 3. The key way 3 is arranged to engage the positioning pin 4 of an interchangeable lens 6. In mounting the lens 6, a bayonet clamping member 5 of the lens 6 and the mount member 2 are bayonet coupled with each other. For this purpose, the clamping member 5 is arranged to be rotatable relative to the body of the interchangeable lens 6. Generally, in attaching and detaching the lens 6 to and from the camera body 1, a rotating operation is performed on a tightening or clamping ring. Therefore, on that occasion, pressing, sliding and impinging forces are exerted from outside between the mount member 2 and the clamping member 5.

Figure 2:
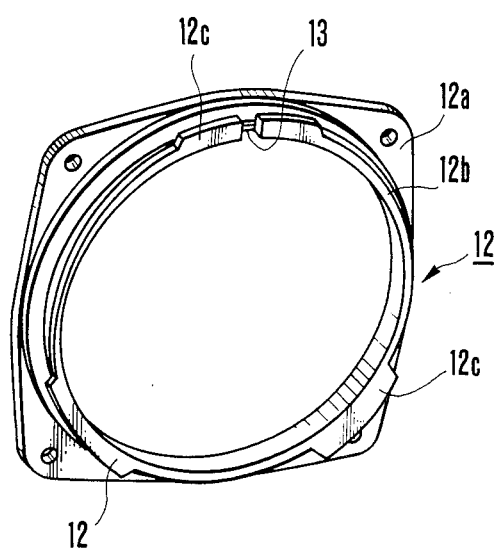
FIG. 2 is an oblique view showing a mount member disposed on the side of the camera body.

FIG. 2 shows an example wherein a mount member 12 of the camera is made of a ceramic material which is shown in FIG. 13. The mount member 12 is provided with a base part 12a which is to be secured to the camera body 1; a cylindrical part 12b which extends from the base part 12a; bayonet engagement parts 12c which extend outwardly and radially relative to an optical axis from the fore end of the cylindrical part 12b; and a keyway 13.

Figure 3A:
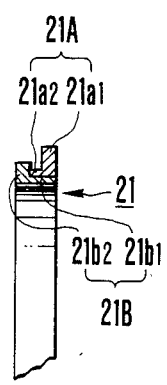
FIGS. 3A, 3B and 3C show, by way of example, a case where the mount member is arranged in two bodies.
Figure 3B:
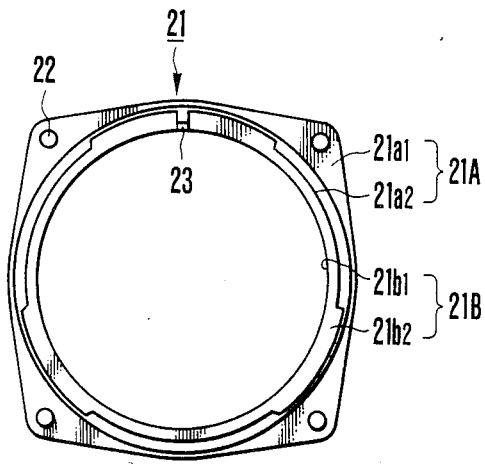

FIGS. 3A and 3B shows an example in which the above-stated mount member is divided into two bodies and one of the divided members receiving the above-stated sliding and impinging forces is made of a ceramic material. The illustration includes a mount member 21 which is to be secured to a fixing part of the camera body 1. The mount member 21 consists of a base part 21A and an engaging part 21B. The base part 21A consists of a fixing part 21a1 which is to be secured to the camera body 1 to have the mount member 21 fixedly attached to the camera body 1; and a ring part 21a2. The fixing part 21a1 is formed in a flat approximately square shape and is provided with screw holes 22 for screwing it to the fixing part of the camera body 1 and a light flux passage which is formed in the middle thereof.

The ring part 21a2 is formed in a tubular shape in front of the fixing part 21a1 and extends in the direction of an optical axis from the circumferential wall of an opening which forms the above-stated light flux passage. The engaging part 21B consists of a ring part 21b1 which is arranged to fittingly engage the above-stated ring part 21a2; and a bayonet part 21b2 which is arranged to engage a bayonet member arranged on the side of the lens 6 which is not shown. The bayonet part 21b2 is made of a ceramic material. In the case of FIG. 3A, the engaging part 21B has its ring part 21b1 arranged to fittingly engage the inner side of the ring part 21a2 of the base part 21A. However, it may be arranged to engage the outer side of the ring part 21a2 instead of the inner side thereof.

Compared with the embodiment shown in FIG. 2, the arrangement of the example of FIGS. 3A and 3B permits reduction in the machining process on grooves and mounting holes to a great degree. Despite this simplification, the latter is comparable with the former in respect to performance. However, in the event that the whole mount part is to be prepared by ceramic molding the groove and mounting hole machining work can be dispensed with by one molding process. In that event, therefore, the advantage of reduced machining work is lessened. The latter example, however, still has an advantage over the former in terms of the structural arrangement and machining work on the mold to be used. Furthermore, in this example, the abovestated base part 21A is made of stainless steel, brass or some other metal material while the engaging part 21B is made of the ceramic material. With the two divided parts 21A, 21B arranged in one unified body, the part 21A made of the metal material gives a shock absorbing effect against an external force. Therefore, the embodiment is not so vulnerable to breakage.

Figure 4A:
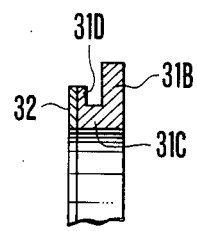
FIGS. 4A and 4B show another example where the mount member is arranged in two bodies.
Figure 4B:
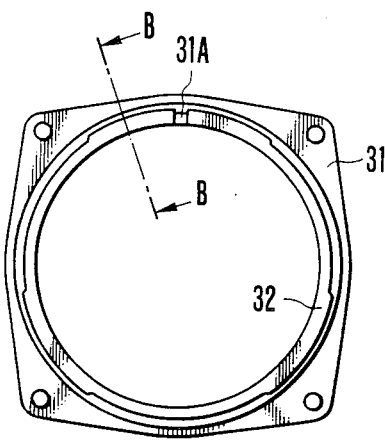

FIGS. 4A and 4B show a modification example, wherein the unification of the base part 21A and the ceramic engaging part 21B of FIGS. 3A and 3B by fitting engagement is replaced with unification by cementing their end faces Referring to FIGS. 4A and 4B, the illustration includes a base part 31, which consists of a fixing part 31B to be secured to the camera body 1, a ring part 31C and a claw part 31D which form a bayonet engaging claw extending from the ring part 31C. A reference numeral 32 denotes a ceramic engaging part. In the case of FIGS. 4A and 4B, which is applicable to a case where no notched part 31A is required in the mount member 2 to be disposed on the side of the camera body 1, one ring 31C is molded with a ceramic material and is secured to the flat surface of the base part 31. This arrangement gives an advantage in terms of reduction in cost.

Figure 3C:
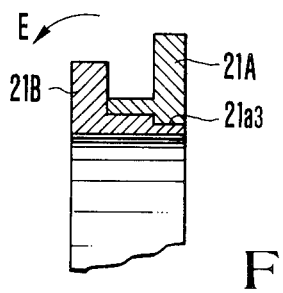

FIG. 3C shows an improvement over the embodiment shown in FIG. 3A. In the case of the arrangement shown in FIG. 3A, a claw and a notched part sometimes do not adequately engage with each other between the camera body 1 and the lens 6. The inadequate engagement takes place especially with a force exerted in the direction of arrow E as shown in FIG. 3C. The force in the direction of the arrow E acts to disengage the ring part 21b1 of the engaging part 21B from the base part 21A and thus causes inadequate fitting engagement between them. To prevent the disengagement of this fitting engagement, the improvement shown in FIG. 3C is arranged to have a stepped part formed at the end of the ring part 21b1 of the engaging part 21B is such a way as to have the stepped part fittingly engage a flange part 21a3 which is provided on the base part 21A.

Compared with the embodiment shown in FIG. 2, the arrangement of the embodiment shown in FIGS. 4A and 4B also permits reduction in cost in terms of secondary machining and in the material. The end face cementing work may be carried out by various methods including bonding, brazing, diffused junction, welding and friction welding among others.

Figure 5A:
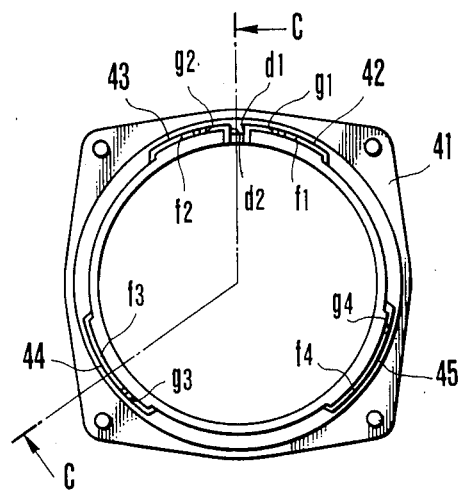
FIGS. 5A and 5B show, by way of example, a case where the engaging part of a mount member is coated with a ceramic material.
Figure 5B:
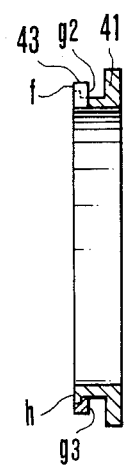

A further embodiment of this invention is arranged as shown in FIGS. 5A and 5B. In this embodiment a main part of the geometrical structure is included in a base part 41 while ceramic engaging parts 42-45 are arranged as functional structural members. The ceramic engaging parts 42-45 include engaging faces d1 and d2 which are arranged to engage the positioning pin 4 of the lens 6; contacting faces f1, f2, f3 and f4 which are arranged to come into contact with the bayonet mount member 2 of the interchangeable lens 6; and clamped engagement faces g1, g2, g3 and g4 which are arranged to come into clamped engagement with the clamping member 5 of the lens 6. A ceramic material and a metal material are thus respectively arranged to play a functional role and a geometrical structural role. The arrangement is such that the required amount of the ceramic material which is expensive is reduced to a great extent and, at the same time, the required secondary machining work is lessened to a great degree. Furthermore, the structure of the mold for molding and machining work on the mold also can be simplified to a great degree. In this case, the ceramic part 42-45 may be obtained by varied methods. For example, the ceramic material is inserted into a die casting or joined on to the metal material by bonding or the like. Furthermore, it goes without saying that the ceramic members 42-45 may be finished by insertion or bonding or by carrying out necessary secondary work after inserting or bonding.

FIG. 5B is a sectional view taken along a line C—C of FIG. 5A. As shown, the flange part at which the ceramic member 43 and the metal member 41 overlap each other has these members 43, 41 cemented together without any inclination as indicated by a reference symbol h. However, since this flange part is thin and in view of necessary strength as well as for molding by die casting, etc., it is preferable to give some inclination to the flanged joining part as in the case of further embodiments which are shown in FIGS. 6A-6D and 7A-7D.

FIGS. 6A-6D and 7A-7D show more specific arrangements of the embodiment shown in FIGS. 5A and 5B. In the case of FIGS. 6A-6D, the bayonet claw part is provided with the key way 3 which is arranged to engage the positioning pin 4 of the lens 6. The base part 41 is provided with two projections T1 and T2 which are arranged to have the key way 3 interposed in between them. In this specific embodiment, these projections T1 and T2 are formed in a dove-tail shape which is arranged to have the ceramic engaging parts 42 and 43 fitted in and secured there.

Figure 6A:
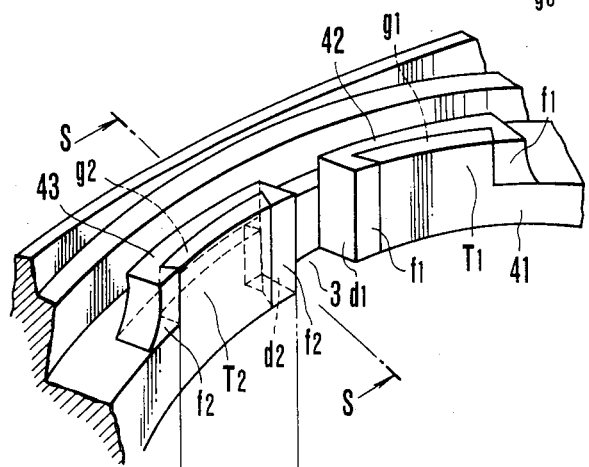
Figure 6B:
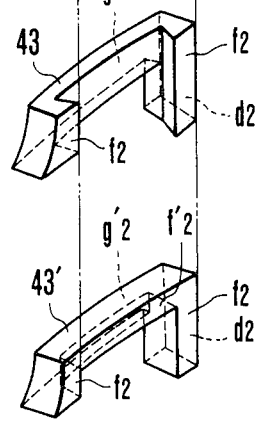

Referring to FIG. 6B, the projection T2 is secured to the ceramic engaging part 43. The engaging part 43 is provided with the engaging face g2 which is arranged to come into sliding contact with the claw part of the bayonet member 2 disposed on the side of the lens 6; and contact faces f2 and f2' which are arranged to fittingly engage the side face of the projection T2. As shown, the contact faces f2 and f2' of the ceramic engaging part 43 are provided with a groove of a dove-tail shape corresponding to the dove-tail shape of the projection T2. The fitting engagement of these parts f2, f2', T2 ensures that the ceramic engaging part 43 is rigidly attached to the base part 41 with positional precision. The method for securing the ceramic engaging part 43 to the base part 41 may be selected from various methods including press fitting, bonding, brazing, diffused junction, casting by die casting, inserting, etc. The other projection T1 is likewise arranged to have the other ceramic engaging part 42 secured thereto.

With the ceramic engaging parts 42 and 43 secured to the two projections T1 and T2 which have the key way 3 interposed in between them, the engaging faces d1 and d2 which are engaging the positioning pin 4 of the lens 6 are formed by a ceramic material. Furthermore, the contact faces f1 and f2 which are contacting with the bayonet member 2 of the interchangeable lens 6 are also formed by the ceramic material. In addition to them, the clamped engagement faces g1 and g2 are also formed by the ceramic material.

Figure 6C:
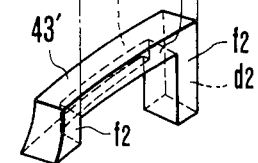

Referring to FIG. 6C, in a modification of the embodiment described above, the ceramic engaging part is arranged as represented by a ceramic engaging part 43' of FIG. 6C. In this instance, the ceramic engaging part 43' is provided with a contact face f'2 which is formed on the same plane as the contact face f2. Compared with the ceramic engaging part 43 of FIG. 6B, the engaging part 43' has a wider face for contacting the bayonet mount member 2 of the interchangeable lens 6. Moreover, the strength of the ceramic engaging part 43' as an independent body increases to a great degree as compared to that of FIG. 6B.

In the case of this embodiment, as shown in a sectional view in FIG. 6D, the joining faces between the base part 41 and the ceramic engaging part 43 are arranged to have an inclination h'. This arranement is advantageous for the monumental strength of the flange part which is thin in consideration of a load L to be imposed by the interchangeable lens 6 from behind the flange part. Another advantage of having this inclination resides in that a better run can be expected to the thin flange part in obtaining the ceramic engaging part 43 by inserting it while die casting the face part.

FIGS. 7A-7D also show further embodiments of the bayonet claw part. In these embodiments the ceramic engaging parts 44 and 45 are not provided with the key way 3 which is shown in FIGS. 6A-6D and are arranged to engage the lens positioning pin 4. The bayonet claw parts shown in FIGS. 7A-7D are arranged in the same manner as in the case of FIGS. 6A-6D with the exception of the absence of the key way 3 and the parts related to the keyway 3.

In the case of FIG. 7A, a projection T3 of a dove-tail shape is formed on the base part 41. A ceramic engaging part 45 or 46 is provided with a groove of a dove-tail shape corresponding to the projection T3 and is secured to the base part 41 via the groove. FIG. 7B shows an embodiment where a ceramic engaging part 44' or 45' which is arranged to have contact faces f'3 or f'4 similar to the example shown in FIG. 6C, is secured to a projection T3' of the base part 41.

FIGS. 7C and 7D show the angular or corner part of the ceramic engaging part shown in FIGS. 6A-6D, 7A and 7B. The ceramic material excels in heat resistance and abrasion resistance under a static pressure condition. However, it is fragile in an impact. In cases where a ceramic material is to be used for a coupling device of a photographing apparatus or in the case of this invention, therefore, the angular or corner part of the mount member 2 requires special consideration. In these embodiments, therefore, the chamfering diameter of corner parts a and bottom parts b of the engaging claw parts (21b2, 44 and 45) are arranged to be 0.1 to 0.3 mm (see FIG. 7C). Furthermore, as viewed from the direction of arrow A in FIG. 7C, an angle $\theta$ of chamfering diameter c is arranged to be 30 to 45 degrees as shown in FIG. 7D.

In these specific embodiments described, the ceramic engaging part is arranged to be cemented to the metal base part. However, it is, of course, possible to have both the base part 41 and the engaging part 45 or 46 formed by a ceramic material. In that instance, the two ceramic components 41 and 45 or 46 can be formed in one unified body in the same manner as the bicolor molding method for plastics. They also may be formed with ceramic materials of two different kinds.

Figure 8:
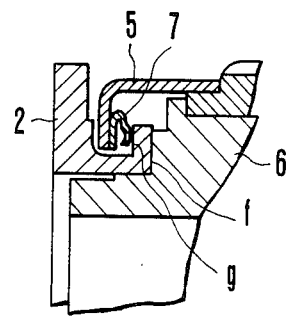
FIG. 8 is a sectional view showing a coupling device for coupling a lens with a camera.

In each of these embodiments, a spring 7 is secured to the clamping member 5 as shown in FIG. 8. The interchangeable lens 6 is mounted on the camera body 1, with the force of the spring 7 exerted between the clamping member 5 and the clamping engagement face g, so that the lens contacting face f of the mount member 2 can be tightly connected to the mounting datum surface of the interchangeable lens 6 in a manner called pull-in type bayonet coupling.

Figure 9:
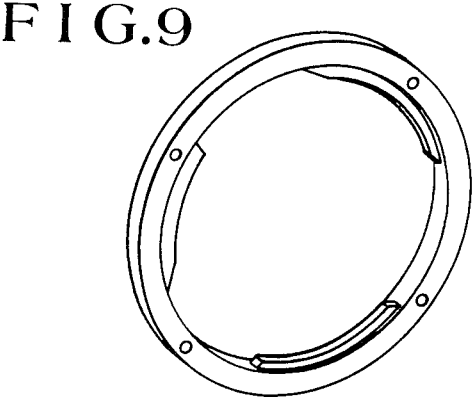
FIGS. 9 and 10 are oblique views showing another bayonet arrangement.
Figure 10:
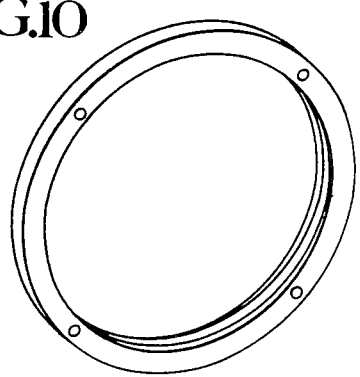

FIG. 9 shows a mount member of the direct bayonet type arranged without recourse to the clamping member 5. FIG. 10 shows a mount member of a screwing-in type. In accordance with this invention, a ceramic material can be used for the whole of or a part of the mount member 2 of each of these types in a manner similar to what is described in the foregoing for mounting and dismounting the interchangeable lens 6 on and from a camera having the mount member 2 of that type.

While examples of using a ceramic material for the mount members 2 on the side of the camera body 1 have been described in the foregoing, a ceramic material can be used also for the clamping member 5 and the bayonet mount member 2 disposed on the side of the interchangeable lens 6. Furthermore, for the functional coupling between the camera body 1 and the interchangeable lens 6, the use of a ceramic material may be partly applied to the mount members 2 disposed on both sides.

For example, in the case where a digital electrical signal is to be transmitted from the lens 6 to the camera body 1, insulating ceramic members may be arranged to bear external forces such as pressing, sliding and impinging forces and to perform optical axis alignment and functions of clamping and sliding faces while a signal member is arranged among them.

In the foregoing, the interchangeable lens 6 has mainly been described as an accessory. However, in the case where a flash device is used as an accessory, a sliding arrangement, of course, may be made in a similar manner between the camera body 1 and the flash device. In that instance, it is possible to retain a sufficient strength as a whole by using a porous ceramic material only for a sliding face with a lubrication effect increased by allowing the material to be impregnated with an oil or the like while a ceramic material of a high bulk density is used for a base body.

In the arrangement of the embodiment described, the functional surfaces are arranged to be made of a ceramic material by using the ceramic material also for geometrical structural parts. However, it is possible to have the functional areas of these geometric parts provided with ceramic coatings which can be applied by varied methods. Typical ceramic oxides which are usually employed include alumina ($Al_2O_3$) and zirconia ($ZrO_2$) and typical ceramic non-oxides include silicon carbide (SiC), silicon nitride ($Si_3N_4$), SIALON (an Si-Al-O-N system compound), etc. In accordance with this invention, one or a plurality of these ceramics are used either singly or in combination as a mixture or with some additives. FIG. 13 shows, by way of example, the physical property data of main ceramic materials in comparison with the data of other materials. In cases where particular importance is attached to resistance against impulsive loads and to toughness, zirconia materials are employed. Where greater strength, impulsive load resistance and toughness are necessary, a composite ceramic material which is prepared by adding carbon fiber, boron fiber, or silicon carbide or alumina fiber or other ceramic fibers may be used. Among Al-Zr materials shown in FIG. 13, a material prepared by dispersing 3 to 5% of zirconia in alumina is most preferable as a ceramic material for the bayonet mounts of the camera and the lens 6. Furthermore, to sufficiently lubricate the surfaces of the ceramic mount, a porous ceramic material is placed within a vacuum and is then impregnated with ethylene tetrafluoride. The material thus obtained gives an improved feeling in mounting the lens 6 on the camera body 1.

For the manufacture of the ceramic parts, varied methods which are generally practiced may be employed. These parts thus may be obtained by baking them after press molding, injection molding or casting or by a hot pressing method. The manufacturing method is, however, not limited to these methods.

The coating treatment can be carried out for the applicable parts by one of various known methods including: Baking after applying a coating by spraying or dipping; metallizing; spattering; ion plating; remote head process; a pyrotechnic spray process; a plasma jet frame coating process; a gas explosion frame coating process; a line explosion frame coating process; a laser coating process; etc.

A desired color tone is obtainable by subjecting a ceramic material to a coloring treatment or by adding a coloring matter thereto or by carrying out a coloring treatment after the ceramic material is finished. For example, a grey color is obtained by having a titanium oxide contained in alumina. The density of the grey color is adjustable by adjusting the amount of the titanium oxide content. By adjusting the coloring density, the interchangeable lens 6 series to which a specific coupling device belongs can be identified. In cases where secondary machining is necessary, machining work such as grinding, cutting, lapping, drilling, laser beam machining, ultrasonic machining, blast machining or some other special machining may be carried out.

Figure 11:
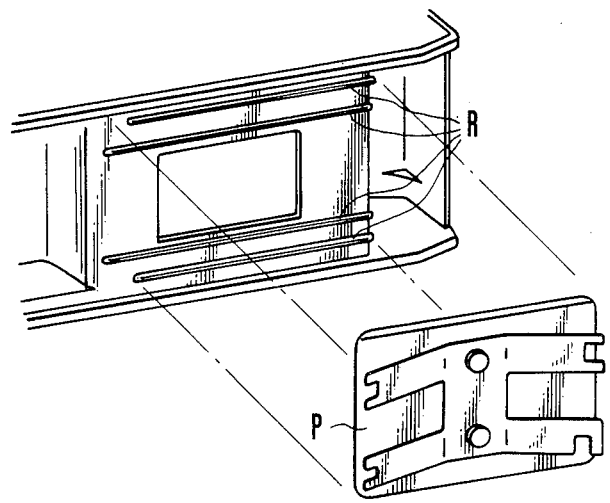
FIGS. 11 and 12 show another embodiment of this invention.
Figure 12:
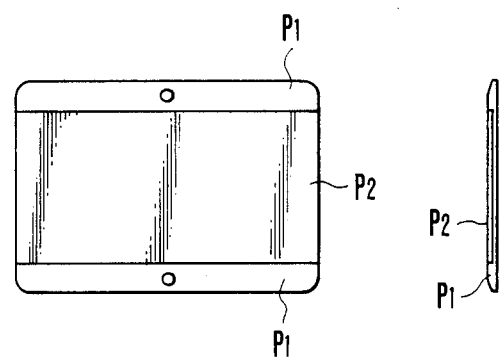

With the mount members 2 arranged to be made of a ceramic material as stated in the foregoing, the imaging performance of the camera can be improved. In addition to that, for better imaging performance, rail members R which are arranged to define a film position for photographing as shown in FIG. 11 may be made of a ceramic material either in their entirety or in part when they are inserted, for example, in a manner as disclosed in U.S. Pat. No. 4,067,032. Or they may be coated with a ceramic material. Such an arrangement ensures the precision of optical relative positions from the lens 6 to the film; prevents the parts from wearing out and secular deterioration; ensures stable optical performance; and ensures satisfactory photographing. Furthermore, referring to FIG. 11, the optical performance for photographing can be enhanced and stabilized by having a pressing plate P which is used for keeping the surface of film in position made of a ceramic material either in its entirety or in part. FIG. 12 shows an embodiment wherein a ceramic material is used for a film sliding surface which is a part of the pressing plate P.

In this instance, the ceramic part may be secured to other members in varied manners including bonding, welding, brazing, diffused junction, pressure welding or may be secured to a fitting part by fitting engagement.

It is also possible to have it inserted by die casting, etc. Furthermore, it is also possible to obtain the ceramic part by ceramic coating. Meanwhile, a base plate part P1 may be made of a plastic material instead of metal. In that instance, the ceramic part may be injection inserted to have it molded and secured in place.

With the mount members 2, etc. arranged to be made of a ceramic material either in their entirety or in part in the manner as described in the foregoing, the following advantages can be obtained:

(1) The lens 6 can be accurately coupled with the camera body 1 on account of sufficient strength and rigidity of the mount members 2 to prevent deformation by external forces, so that a sharp focus can be obtained.

(2) Since there takes place no secular deterioration, the coupling precision or accuracy mentioned in paragraph (1) above lasts over a long period of time.

(3) Since there takes place no wear and tear nor any scar by virtue of the high degree of hardness, the above-stated precision lasts over a long period.

(4) Besides no wear and no scar, a low coefficient of friction permits smooth surface finishing. Therefore, mounting and dismounting can be smoothly performed. The smoothness remains unchanged over a long period of time.

(5) A low specific gravity of the ceramic material permits reduction in weight. This advantageous effect is salient where the whole mount is made of the ceramic material. The degree of weight reducing effect might be lessened depending on the use of the ceramic material in combination with a conventional material used for mount members. The effect is lowered particularly where zirconia which is of a high specific gravity is used with importance attached to performance.

(6) Since the ceramic material which permits the manufacture of the ceramic part by one molding process dispense with a plating process, manufacturing processes can be shortened for reduction in cost. However, in the event of use of an expensive ceramic material with more importance attached to performance, the cost reducing advantage might be lessened or sometimes the cost might rather increases. However, that presents no problem where cost reduction is not a main objective.

(7) The smooth and beautiful surface finishing gives an agreeable feeling of precision and an agreeable appearance which enhances the value as a commercial product.

(8) Since a wider latitude is allowed in selecting a desired color tone than a metal material, the value as a commercial product can be increased also in that connection.

(9) As regards the advantage mentioned in paragraph (8) above, selection of a black color precludes any reflection of light to permit photographing without hindrance by a glittering light, so that an excellent picture can be obtained.

What is claimed is:

1. A coupling device for a photographing apparatus, comprising:
    a mount member having a base part secured to said photographing apparatus, a cylindrical part which extends from said base part and a projecting part which extends outward from the fore end of the cylindrical part radially relative to an optical axis; and
    a bayonet mount member including a ceramic engaging member which is made of a ceramic material and is placed on said projecting part, a claw part being formed jointly by said projecting part of the mount member and said ceramic engaging member, said claw part being arranged to engage the bayonet member of an accessory to be mounted on said photographing apparatus.

2. A coupling device according to claim 1, wherein the contacting faces of the projecting part of said mount member and the ceramic engaging member are tapered.

3. A coupling device according to claim 1, wherein the circumferential end surface of said ceramic engaging member is curved.

4. A coupling device according to any one of claims 1 to 3, wherein said mount member is arranged to be the mount member of an accessory which is to be mounted on said photographing apparatus.

5. A coupling device according to claim 4, wherein said accessory is an interchangeable lens.

* * * * *